United States Patent
Boye

(10) Patent No.: US 9,126,064 B2
(45) Date of Patent: Sep. 8, 2015

(54) COMPOSITE TEXTILE MATERIAL AND ARTICLE OF PROTECTION FOR NRBC APPLICATIONS

(75) Inventor: Jacques Boye, Sete (FR)

(73) Assignee: PAUL BOYE TECHNOLOGIES, Sete (FR)

( * ) Notice: Subject to any disclaimer, the term of this patent is extended or adjusted under 35 U.S.C. 154(b) by 1408 days.

(21) Appl. No.: 12/158,055

(22) PCT Filed: Dec. 15, 2006

(86) PCT No.: PCT/FR2006/002760
§ 371 (c)(1),
(2), (4) Date: Oct. 30, 2008

(87) PCT Pub. No.: WO2007/071835
PCT Pub. Date: Jun. 28, 2007

(65) Prior Publication Data
US 2009/0093178 A1 Apr. 9, 2009

(30) Foreign Application Priority Data
Dec. 19, 2005 (FR) ...................................... 05 12911

(51) Int. Cl.
*A62D 5/00* (2006.01)
*A62B 17/00* (2006.01)
(Continued)

(52) U.S. Cl.
CPC ................ *A62B 17/006* (2013.01); *A62D 5/00* (2013.01); *B32B 5/022* (2013.01); *B32B 5/18* (2013.01); *B32B 5/245* (2013.01); *B32B 5/26* (2013.01); *D04H 3/02* (2013.01); *D04H 13/00* (2013.01); *D06M 16/00* (2013.01); *D06M 17/00* (2013.01); *A41D 31/0083* (2013.01); *A62D 2101/22* (2013.01); *B32B 2262/0253* (2013.01); *B32B 2262/0276* (2013.01); *B32B 2262/106* (2013.01); *B32B 2264/102* (2013.01); *B32B 2264/108* (2013.01); *B32B 2307/7145* (2013.01);
(Continued)

(58) Field of Classification Search
CPC ................... A62B 17/006; A62D 5/00; B32B 2262/0253; B32B 2262/0276; B32B 2264/108; B32B 5/022; B32B 5/26; B32B 2307/7265; B32B 2264/102; B32B 2307/724; B32B 2307/7145; B32B 2262/106; D06M 16/00; D06M 17/00; Y10T 442/674; Y10T 442/197; Y10T 442/675; Y10T 442/68; Y10T 442/2525; Y10T 442/60; Y10T 442/647
USPC ......... 442/123, 327, 400, 394, 395, 373, 382, 442/393, 401, 417
See application file for complete search history.

(56) References Cited

U.S. PATENT DOCUMENTS

| 6,464,887 B1 | 10/2002 | De La Bruniere |
| 2001/0018095 A1 | 8/2001 | Shlenker et al. |

(Continued)

FOREIGN PATENT DOCUMENTS

| DE | 20319676 U1 * | 2/2005 |
| EP | 1 092 471 A1 | 4/2001 |
| FR | 2 678 172 A | 12/1992 |

*Primary Examiner* — Elizabeth Cole
(74) *Attorney, Agent, or Firm* — Young & Thompson

(57) ABSTRACT

The invention proposes a composite textile material for NRBC applications, comprising a first material capable of providing a physical barrier to the penetration of microorganisms and a second material capable of trapping, by absorption and/or adsorption, said microorganisms stopped by said first material and article of protection made of said material.

13 Claims, 4 Drawing Sheets

(51) Int. Cl.
  *B32B 5/26* (2006.01)
  *D04H 3/02* (2006.01)
  *D04H 13/00* (2006.01)
  *D06M 16/00* (2006.01)
  *D06M 17/00* (2006.01)
  *B32B 5/02* (2006.01)
  *B32B 5/18* (2006.01)
  *B32B 5/24* (2006.01)
  *A41D 31/00* (2006.01)
  *A62D 101/22* (2007.01)

(52) U.S. Cl.
  CPC ... *B32B2307/724* (2013.01); *B32B 2307/7265* (2013.01); *Y10T 442/197* (2015.04); *Y10T 442/2525* (2015.04); *Y10T 442/60* (2015.04); *Y10T 442/647* (2015.04); *Y10T 442/674* (2015.04); *Y10T 442/675* (2015.04); *Y10T 442/68* (2015.04)

(56) References Cited

U.S. PATENT DOCUMENTS

| | | |
|---|---|---|
| 2005/0042400 A1 | 2/2005 | Cerbini et al. |
| 2005/0079379 A1* | 4/2005 | Wadsworth et al. .......... 428/684 |
| 2005/0191918 A1* | 9/2005 | Langley et al. ................. 442/59 |
| 2007/0134483 A1* | 6/2007 | Bohringer et al. ......... 428/297.4 |

* cited by examiner

COMPOSITE TEXTILE MATERIAL AND ARTICLE OF PROTECTION FOR NRBC APPLICATIONS

This application is a 371 of PCT/FR2006/002760 filed Dec. 15, 2006.

BACKGROUND OF THE INVENTION

1. Field of the Invention

This invention relates to a composite textile material, in particular of the type that protects against nuclear, radiological, biological and chemical attacks, called N.R.B.C., or else in the military field described as chemical warfare agents, as well as protective items manufactured from said material.

2. Introduction and Prior Art

The protection against the NRBC (nuclear, radiological, biological and chemical) risks requires the use of various protective items (protective clothing, overalls, gloves, socks, hoods, ponchos, covering the body of the user partially or completely, etc., air filtration systems or units . . . ) designed to prevent contact with toxic agents (in liquid or gaseous form) with the skin or mucous membranes of the user. Thus, in the prior art, two ranges of protective items have been developed: those produced from impermeable materials and those using permeable materials.

In the first case, the wearer is completely protected from the outside threat, but his body cannot exchange calories with the outside environment. The extended wearing of this type of clothing therefore leads irremediably to problems of hyperthermia that can become deadly.

To remedy this problem, clothing that uses air-permeable materials has been developed. This clothing uses a set of textile materials that comprise several layers that consist in general of an outer layer—on the side of the environment outside of the user—, a layer of filter material, and an inner layer—on the side of the user—, with the following characteristics and functions:

The outer layer: it consists of an outer textile whose primary functions are to ensure the sturdiness of the clothing—resistance to abrasion and tearing—and to ensure the non-penetration of attacker agents in liquid form. This non-penetration is generally achieved by the application of a hydrophobic and oleophobic treatment on the outer textile, as described in, for example, the document FR-A-2 678 172.

The layer of filter material: it ensures the filtration of toxins in gaseous form owing to the adsorbent carbon particles that it contains. The activated carbon particles are in general bonded to a textile substrate or to a non-woven substrate. As examples of these technologies, it is possible to consider:

The impregnated foams of activated carbon powder as described in the documents FR-A-2,678,172; U.S. Pat. No. 5,277,963 and the activated carbon balls that are bonded to a textile as described in U.S. Pat. No. 5,334,436.

The filter material layer can also come in the form of an activated carbon tissue as taught in U.S. Pat. No. 5,731,065.

The inner layer: it consists of a preferably flexible textile and ensures the comfort of the wearer by preventing direct contact of the filter material with the skin. It also plays a role in the storage of sweat.

Problems Remaining to be Solved

The major problem of materials for protective clothing of the prior art resides in their actual inability to stop the biological threat. Furthermore, the biological threat, in other words the attacks by pathogenic microorganisms, whether it be of bacterial, viral or sporulated nature or of another nature, is conveyed by means of a solid or liquid agent, in particular of the aerosol type.

The stopping of liquid or solid particles, in particular an aerosol of approximately 0.1 micron to approximately 10 microns, remains problematic.

The prior protective solutions against the NRBC-type biological aerosols reside in the adaptation of the constituent materials of the protective clothing to the threat.

Thus, it is known to use an impermeable material, obtained by laminating a film or by "coating," so as to oppose the threat of biological aerosol, whereby a continuous film does not let any particle pass—as taught in the document FR8917065. This type of material is particularly effective against the penetration of solid or liquid particles but exhibits the major drawback of being airtight. Wearing NRBC protective clothing produced from these materials invariably leads to an important thermal stress that limits the period of use of the clothing.

Changes in these materials—airtight but having a permeability to water vapor—have been proposed of the semi-permeable membrane type, such as, for example, the one that is sold under the trade name GORETEX®, but the changes do not make it possible to ensure the thermal comfort level offered by air-permeable materials.

In the case of air-permeable protective materials, a reduction of the penetration of the aerosols could be achieved, nevertheless, by means of a reduction of the air-permeability of the protective complex.

The permeability as described in this invention is measured according to the standard NF EN ISO 9237.

However, the reduction of the air permeability considerably influences the comfort of the clothing, which itself can be quantified by the permeability to water vapor.

The permeability to water vapor as taught in this invention is measured by the so-called evaporation resistance according to the standard EN 31092-ISO 11092.

Thus, the reduction of the air-permeability of the protective materials of the prior art, regardless of their composition, induces an increase in the evaporation resistance and therefore leads inevitably to a strong reduction of comfort, in particular of protective items such as clothing.

There is therefore a need for a material that ensures an effective protection against the NRBC attacks, in particular of the type in biological aerosol form.

It is also desirable that this material ensures a real comfort to a protective item manufactured from the latter, in particular by the preservation of an air-permeability property.

This invention aims precisely at meeting this requirement.

Also, this invention first relates to a composite textile material for NRBC applications that comprises a first material that can create a physical barrier to the penetration of microorganisms and a second material that can trap—by absorption and/or adsorption—said microorganisms that are stopped by said first material.

The material according to the invention offers the following advantages:

Improved effectiveness as to the stopping of biological aerosols

Storage of the microorganisms before they are destroyed

Increased air-permeability, which ensures real comfort.

The material according to the invention also offers the following additional or alternative advantages or characteristics:

Said first material is a non-woven material that is selected from the group that consists of thermoplastic polymers, in particular polyester, polyolefin, with viscose; preferably said material is a polyolefin, and in particular a polypropylene, or a material that is obtained by a process that is selected from among the spun, meltblown, spun meltblown spun, spun meltblown meltblown spun technologies called SMS, SMMS, respectively; this process is preferably SMS.

Said second material is selected from among the thermoplastic polymers, in particular polyamide, polyester, or from among the activated carbons that preferably come in the form of powders and/or fibers, or else from among the zeolites.

Said material according to the invention has an air-permeability.

Said air-permeability of said material according to the invention is selected within an interval of 101 $l/m^2 \cdot s$ to 1000 $l/m^2 \cdot s$ that is measured at 100 Pa, preferably about 100 $l/m^2 \cdot s$ to about 500 $l/m^2 \cdot s$.

Said second material is treated by a process that is selected from among the grafting or impregnation techniques so as to make it able to destroy microorganisms that are absorbed and/or adsorbed by said second material.

Said second material comprises at least one agent that is able to destroy the microorganisms, in particular this agent is of the biocide type, preferably grafted on said second material.

Said material according to the invention also comprises a third substrate material that is able to support said second material.

Said substrate material is selected from the group that consists of foams, meshes, fabrics and non-woven fabrics.

The object of this invention is also a protective item that is manufactured from the material according to the invention.

According to a preferred embodiment, the protective item according to the invention is selected from among protective clothing, overalls, gloves, socks, hoods, ponchos, covering the body of the user partially or completely, air filtration systems or units.

BRIEF DESCRIPTION OF THE DRAWING FIGURES

This invention will now be described in a more detailed manner in its characteristics and advantages using embodiments provided by way of purely illustrative and nonlimiting examples and accompanying drawings in which.

Figure 2:
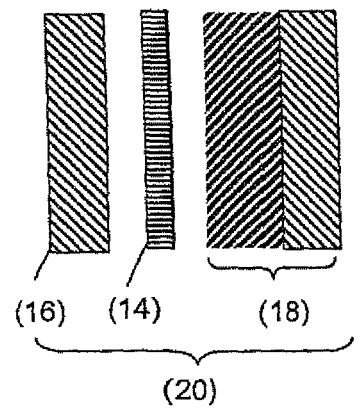
FIG. 2 shows an example of an item manufactured from a composite textile material (20) according to this invention. This item consists of the material of FIG. 1 (14) that is sandwiched between an outer cotton polyester fabric (16) and a filter material layer made of activated carbon meshes, thermal-bonded onto a comfort textile (18), in particular made of polyester.
Figure 3:
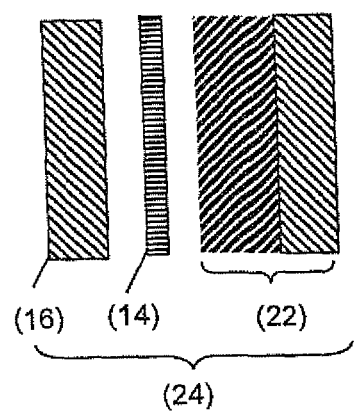

FIG. 3 repeats the example that is illustrated in FIG. 2, whereby the layer of filter material is a foam that is impregnated with activated carbons (22).

Figure 4:
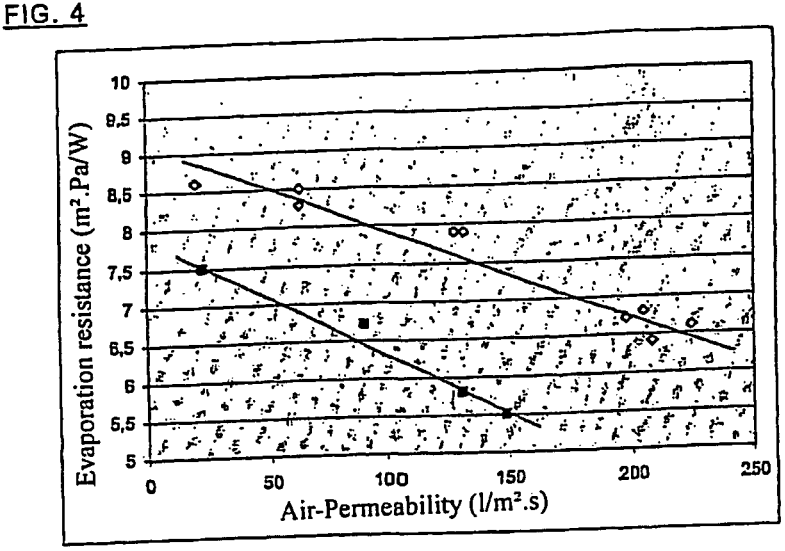
Figure 5:
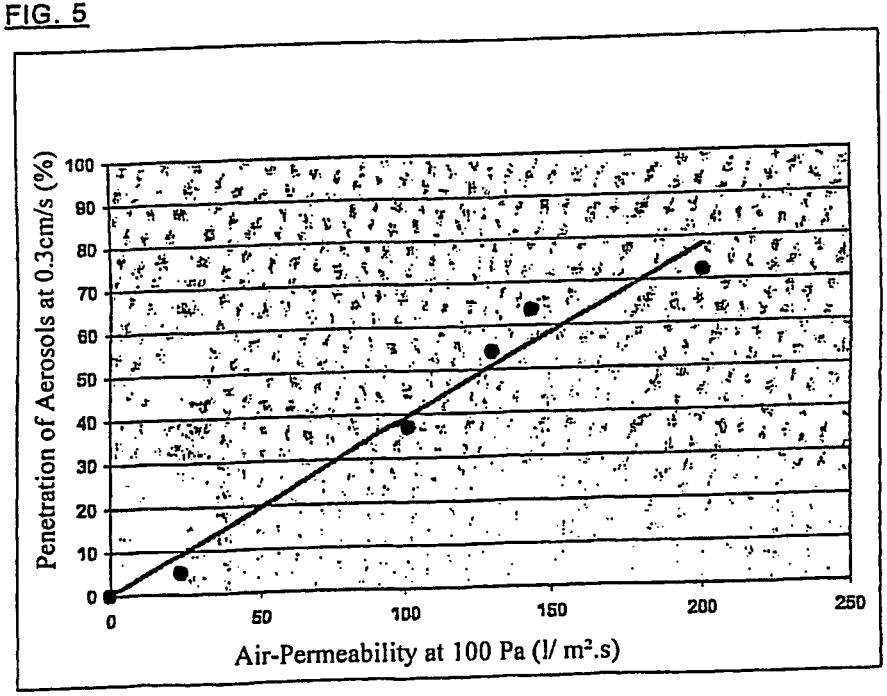

FIG. 4 is a graph that illustrates the linear relationship that exists between the evaporation resistance and the air-permeability, and FIG. 5 is a graph that shows the evolution of the penetration of a biological aerosol based on the air-permeability.

DETAILED DESCRIPTION OF THE INVENTION

This invention thus makes it possible to "manage" what happens to the microorganisms that are stopped by the material according to the invention. The thus stopped microorganisms, during the period of use of a permeable NRBC protective item, generally used for 24 hours, can no longer multiply or migrate toward the skin.

The object of the protective item according to this invention is also to prevent the migration of stopped microorganisms, to destroy them, according to a preferred embodiment.

The inventor of this invention observed that some non-woven fabrics make it possible to get away from the linear relationship (FIG. 5) that exists between the air-permeability and the stopping power of a biological aerosol.

EXAMPLES

Example 1

Composite Textile Material According to this Invention

Figure 1:
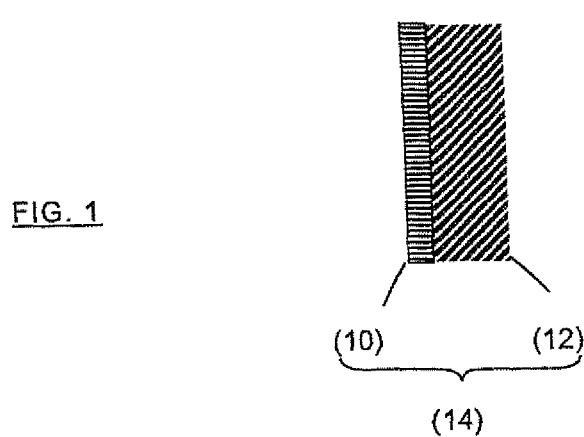
FIG. 1 shows an example of a composite textile material (14) according to this invention that comprises a first barrier material that consists of a non-woven material (10) and a second material that consists of a substrate material that is made of non-woven material impregnated with a powder (12) that absorbs the microorganisms.

A noteworthy improvement of the performance levels against the biological aerosols is achieved by the use—see FIG. 1—of an SMS-type barrier non-woven fabric (10) and a surface mass of 35 $g/m^2$ of polypropylene that has been treated so as to exhibit properties of water and alcohol resistance.

This known material is put on the market under the reference "SMS35" of the PGI Company. This material has an air-permeability of about 270 $l/m^2 \cdot s$.

A composite textile material according to the invention (14) that uses the SMS35 non-woven fabric (10) was produced. By contrast, this material is obtained by the gluing in a conventional manner of a non-woven fabric (10) to a layer of a filter material (12), composed of a non-woven polyester that is impregnated with 40 $g/m^2$ of an absorbent powder as taught in the document FR9912619.

This composite textile material (14) has been tested according to a forced penetration protocol of microorganisms (such as bacillus globigii) in the form of biological aerosol at penetration speeds of about 0.3 cm/s and 1.5 cm/s. This protocol uses an analyzer such as the one that is described by the TNO Laboratories of Rijswijk in The Netherlands.

The protective properties of this material according to this invention (14) are compared to a material of conventional NRBC clothing that is characterized by low air-permeability.

The results are provided in TABLE 1 below:

TABLE 1

|  | Material of the Invention (14) | Material of the Prior Art |
| --- | --- | --- |
| Air-Permeability (100 Pa) | 90 $l/m^2 \cdot s$ | 23 $l/m^2 \cdot s$ |
| Penetration of an Aerosol at 0.3 cm/s | 3.8% | 29% |
| Penetration of an Aerosol at 1.5 cm/s | 9.1% | 42% |

It appears that the composite textile material according to the invention, even though the air-permeability is three times more than the known prior material under consideration, allows a clearly improved protection again the microorganisms in the form of a biological aerosol.

Example 2

Preferred Composite Textile Material According to this Invention

In this other embodiment, the composite textile material of the invention (14), cited in Example 1, was inserted in a material of the prior art as described in FIG. 2. This material is used here as an intermediate free lining between an outer fabric (16) and a layer of filter material (18). The layer of filter material (18) is in this case specifically constituted by an activated carbon in the form of a mesh—in particular a mesh such as the one that is put on the market by the Charcoal Cloth Company and sold under the reference FM3K—that is thermal-bonded onto a polyester comfort textile. The outer fabric (16) that is used is a cotton polyester fabric.

The set of materials (14)+(16)+(18) is referenced (20) and shows a preferred embodiment of this invention. It is compared to a prior conventional material that comprises the same components as (20) except for the material (14).

The results are provided in TABLE 2 below.

TABLE 2

|  | Material of the Invention (20) | Material of the Prior Art |
| --- | --- | --- |
| Air-Permeability (100 Pa) | 95.2 l/m² · s | 149.2 l/m² · s |
| Penetration of an Aerosol at 0.3 cm/s | 1.1% | 63.6% |
| Penetration of an Aerosol at 1.5 cm/s | 9.8% | 74% |
| Evaporation Resistance | 6.4 m² · Pa/W | 5.5 m² · Pa/W |

It appears that the use of a material (20) according to this invention makes it possible to considerably reduce the penetration of the biological aerosols, while preserving a strong air-permeability of about 95 l/m²·s measured at 100 Pa.

This result is particularly noteworthy.

Actually, if reference is made to FIG. 5, we note that a material of the prior art that has an air-permeability of about 95 l/m²·s measured at 100 Pa leads to a penetration value of a biological aerosol of 40%.

With a material according to this invention as produced in Example 2 as explained above, the penetration is limited, in a completely surprising manner, to 1%.

Example 3

Most Preferred Composite Textile Material According to this Invention

The material according to the invention of Example 2 has been modified in its composition in that the filter material layer (22) as illustrated is composed here of a foam that is impregnated with activated carbons, as taught in the document FR9107860.

The composite textile material according to the invention (24) is illustrated in FIG. 3 and is compared to a prior conventional material that comprises the same components with the exception of the filter material layer (14).

The results are provided in TABLE 3 below.

TABLE 3

|  | Material According to the Invention (24) | Material of the Prior Art |
| --- | --- | --- |
| Air-Permeability (100 Pa) | 94.9 l/m² · s | 200 l/m² · s |
| Penetration of an Aerosol at 0.3 cm/s | 2.4% | 72% |
| Penetration of an Aerosol at 1.5 cm/s | 14% | 77% |
| Evaporation Resistance | 7.6 m² · Pa/W | 6.6 m² · Pa/W |

It appears that the use of a material (24) according to this invention makes it possible to considerably reduce the penetration of biological aerosols, while preserving a strong air-permeability of about 95 l/m²·s, measured at 100 Pa.

It should also be noted that the material of the invention has a low-evaporation resistance that ensures improved comfort for the user of a protective item manufactured from the material according to this invention.

This result is particularly advantageous compared to those obtained thus far using conventional materials of the prior art.

The invention claimed is:

1. A composite textile material for NRBC applications, comprising:
    a first non-woven material configured to create a physical barrier to penetration of an aerosol of microorganisms, said first material being a spunbond meltblown spunbond barrier non-woven fabric;
    a second material that is able to trap—by absorption and/or adsorption—said microorganisms being stopped by said first material, said second material being selected from non-woven polyesters; and
    a third substrate material selected from foams impregnated with activated carbon that can support said second material,
    wherein the composite textile material provides an air-permeability of 10 l/m²·s to 1000 l/m²·s measured at 100 Pa and a limited penetration of 2.4% at 0.3 cm/s of said aerosol.

2. The material according to claim 1, wherein said second material comprises activated carbons that come in a form of powders and/or fibers.

3. The material according to claim 1, wherein said second material is treated by a process that is selected from among grafting or impregnation techniques so as to enable said second material to destroy the microorganisms that are absorbed and/or adsorbed by said second material.

4. The material according to claim 3, wherein said second material comprises at least one agent that can destroy the microorganisms this agent being a biocide grafted on said second material.

5. A protective item produced from a composite textile material for NRBC applications according to claim 1.

6. The item according to claim 5, wherein the item is selected from among protective clothing, overalls, gloves, socks, hoods, ponchos, covering the body of the user partially or completely, air filtration systems or units.

7. The material according to claim 1, wherein said second material comprises activated carbons or zeolites.

8. A composite textile material for NRBC applications, comprising:
- a first non-woven material configured to create a physical barrier to penetration of an aerosol of microorganisms, said first material being a spunbond meltblown spunbond barrier non-woven fabric;
- a second material that is able to trap—by absorption and/or adsorption—said microorganisms being stopped by said first material, said second material being selected from non-woven polyesters; and
- a third substrate material selected from foams impregnated with activated carbon that can support said second material,
- wherein an air-permeability of the composite textile material is, measured at 100 Pa, from about 100 $l/m^2 \cdot s$ to about 500 $l/m^2 \cdot s$, and a limited penetration of 2.4% at 0.3 cm/s of said aerosol.

9. The material according to claim 1, wherein the spunbond meltblown spunbond barrier non-woven fabric has a surface mass of 35 $g/m^2$.

10. The material according to claim 1, wherein the spunbond meltblown spunbond barrier non-woven fabric is formed from polypropylene.

11. The material according to claim 10, wherein the polypropylene has been treated to exhibit properties of water and alcohol resistance.

12. The material according to claim 1, wherein the spunbond meltblown spunbond barrier non-woven fabric has an air permeability of about 270 $l/m^2 \cdot s$.

13. The material according to claim 1, wherein the second material is composed of non-woven polyesters that have been impregnated with 40 $g/m^2$ of an absorbent powder.

* * * * *